US009588783B1

(12) United States Patent
Syvain et al.

(10) Patent No.: US 9,588,783 B1
(45) Date of Patent: Mar. 7, 2017

(54) METHOD AND APPARATUS FOR REFERENCING BETWEEN THREE DIMENSIONAL COMPUTER-GENERATED VIRTUAL ENVIRONMENTS

(75) Inventors: Dany Syvain, Gatineau (CA); Nicholas Sauriol, Kanata (CA); Arn Hyndman, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 1810 days.

(21) Appl. No.: 12/154,718

(22) Filed: May 27, 2008

Related U.S. Application Data (60) Provisional application No. 60/931,593, filed on May 24, 2007.

(51) Int. Cl.
G06F 17/30 (2006.01)
G06F 9/06 (2006.01)
G06F 9/44 (2006.01)

(52) U.S. Cl.
CPC .............. *G06F 9/4446* (2013.01); *G06F 9/06* (2013.01); *G06F 17/30* (2013.01); *G06F 17/30873* (2013.01)

(58) Field of Classification Search
CPC ................ A63F 13/12; G06F 9/4446
USPC ..................................................... 715/706
See application file for complete search history.

(56) References Cited

U.S. PATENT DOCUMENTS

| | | | | |
|---|---|---|---|---|
| 5,760,771 A * | 6/1998 | Blonder et al. | | 715/854 |
| 5,884,029 A * | 3/1999 | Brush et al. | | 709/202 |
| 6,346,956 B2 * | 2/2002 | Matsuda | | 715/848 |
| 7,065,553 B1 * | 6/2006 | Chesley et al. | | 709/205 |
| 2001/0018667 A1 * | 8/2001 | Kim | | 705/14 |
| 2002/0186244 A1 * | 12/2002 | Matsuda et al. | | 345/757 |
| 2002/0188678 A1 * | 12/2002 | Edecker et al. | | 709/204 |
| 2003/0005439 A1 * | 1/2003 | Rovira | | 725/37 |
| 2005/0086605 A1 * | 4/2005 | Ferrer et al. | | 715/745 |
| 2006/0143569 A1 * | 6/2006 | Kinsella et al. | | 715/752 |
| 2006/0294465 A1 * | 12/2006 | Ronen et al. | | 715/706 |
| 2007/0063999 A1 * | 3/2007 | Park | | 345/419 |
| 2007/0101276 A1 * | 5/2007 | Yuen | | 715/757 |
| 2007/0136745 A1 * | 6/2007 | Garbow et al. | | 725/34 |
| 2008/0096665 A1 * | 4/2008 | Cohen | | 463/42 |

\* cited by examiner

*Primary Examiner* — Doon Chow
*Assistant Examiner* — Le Nguyen (57) ABSTRACT

References between three dimensional computer-generated virtual environments may be used to enable objects, activities, and Avatars to move between and within multiple virtual environments hosted by multiple different virtual environment servers/server systems. Links may be used to reference particular locations and orientations within target virtual environments. Vistas may also be created to allow a view into a target virtual environment to be presented to a user in a resident virtual environment. Links and vistas may be combined to create portals, whereby a user may be presented with a view of a target virtual environment in the resident virtual environment. The view of the target virtual environment may be caused to change as the user approaches the vista or moves relative to the vista to make it appear like the user is seeing into the target virtual environment. If the user goes through the vista the link may transport the user into the target virtual environment.

19 Claims, 3 Drawing Sheets

METHOD AND APPARATUS FOR REFERENCING BETWEEN THREE DIMENSIONAL COMPUTER-GENERATED VIRTUAL ENVIRONMENTS

CROSS-REFERENCE TO RELATED APPLICATIONS

This application claims priority to U.S. Provisional Patent Application No. 60/931,593, filed May 24, 2007, entitled Hyperlinking Virtual Environments, the content of which is hereby incorporated herein by reference.

BACKGROUND OF THE INVENTION

Field of the Invention

The present invention relates to virtual environments and, more particularly, to a method and apparatus for referencing between three dimensional computer-generated virtual environments.

Description of the Related Art

Virtual environments simulate actual or fantasy 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. Multiple players may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment engine that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create an Avatar and then cause the Avatar to "live" within the virtual environment.

As the Avatar moves within the virtual environment, the view experienced by the Avatar changes according to where the Avatar is located within the virtual environment. The views may be displayed to the participant so that the participant controlling the Avatar may see what the Avatar is seeing. The participant may control the Avatar using conventional input devices, such as a computer mouse and keyboard. The inputs are sent to the virtual environment client which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, and other types of interactions between groups of users and between businesses and users.

A particular virtual environment may be hosted by a virtual environment server, or a group of servers may be used to host a particular virtual environment. Unfortunately, although the servers may all be connected to the same network, the virtual environments themselves are distinct environments, almost as if they were separate worlds, such that characters and things existing in one virtual environment would have no meaning/context/counter presence in another virtual environment. Accordingly, it would be advantageous to be able to reference between three dimensional computer-generated virtual environments to enable objects, activities, and Avatars to move between and within multiple virtual environments hosted by multiple different virtual environment servers/server systems.

SUMMARY OF THE INVENTION

A method and apparatus for referencing between three dimensional computer-generated virtual environments is provided. The referencing system may be used to enable objects, activities, and Avatars to move between and within multiple virtual environments hosted by multiple different virtual environment servers/server systems. This opens the virtual environment to transform the virtual environment from an isolated three dimensional island to an inclusive three dimensional realm of a larger three dimensional space.

In one embodiment, a link is used to reference between virtual environments. The link may specify a location within the other virtual environment as well as an orientation at the location such that by clicking on the link or otherwise interacting with the link, the participant is transported to the location and placed at the specified orientation in the other virtual environment.

In another embodiment, the virtual environments may be connected so as to appear adjacent each other in virtual space. The actual virtual environments, however, are hosted by different servers and are separate virtual environments. In this embodiment, a participant in one virtual environment may be provided with a vista into another virtual environment so that the participant can see into the other virtual environment through the vista. The vista may be specified using a link that specifies the location of the vista in the second environment as well as the orientation of the vista so that the view into the second virtual environment may be specified.

When a participant in this embodiment is proximate a vista, the information to be shown to the viewer on the vista is obtained from the second virtual environment (target virtual environment) and presented to the viewer through the vista. The location of the viewer in the resident virtual environment relative to the vista may be passed to the target virtual environment to enable the target virtual environment to customize the content to be shown to the viewer to coincide with their perspective through the vista into the target virtual environment. The view into the target virtual environment may change as the user moves relative to the vista in the resident virtual environment. If the user goes through the vista, the user may be transported via a link into the target virtual environment to the location/orientation presented to the user via the vista.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
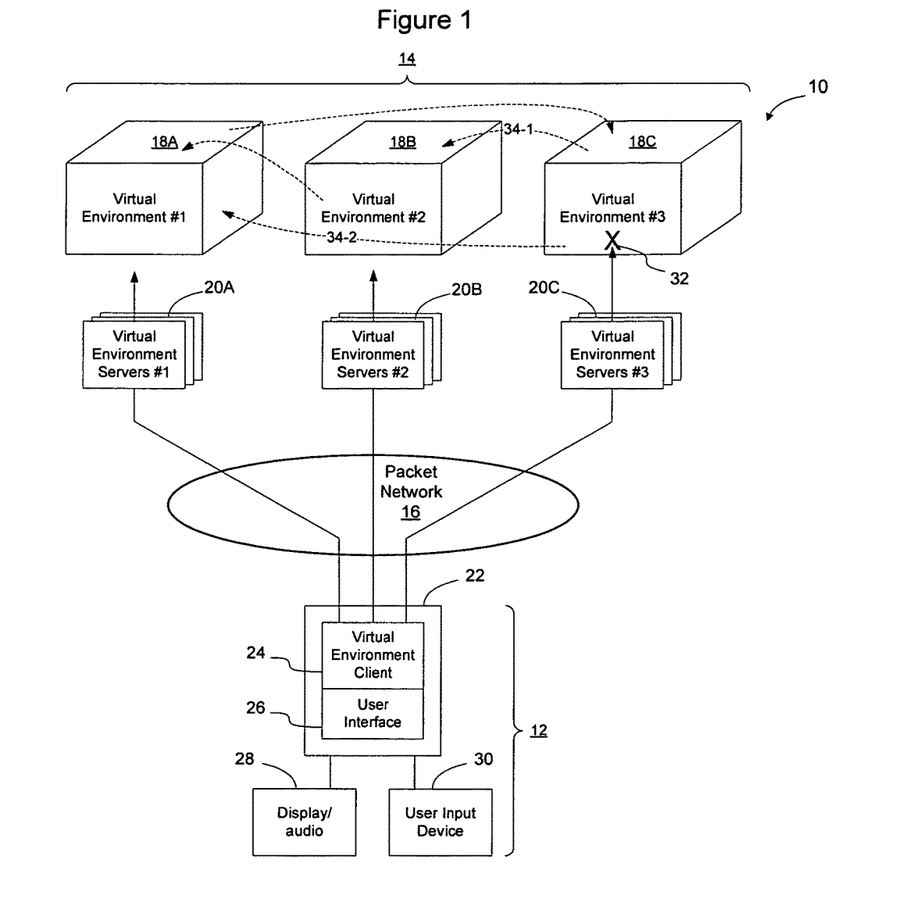
FIG. 1 is a functional block diagram of a portion of an example system showing the interaction between a user and multiple linked virtual environments.

FIG. 1 shows a portion of an example system 10 showing the interaction between a user 12 and multiple linked virtual environments 14. As shown in FIG. 1, the user 12 and multiple virtual environments 14 may be interconnected by a packet network 16 or other common communication infrastructure.

Each virtual environment 18A, 18B, 18C may be implemented by one or more virtual environment servers 20A, 20B, 20C. The virtual environments may be any type of virtual environment, such as a virtual environment created for an on-line game, a virtual environment created to implement an on-line store, a virtual environment created to implement an on-line training facility, or for any other purpose. Virtual environments are being created for many reasons, and may be designed to enable user interaction to achieve a particular purpose. Example uses of virtual environments include gaming, business, retail, training, social networking, and many other aspects.

The virtual environments 18A-C in FIG. 1 are distinct and not related, in that they are not all part of the same virtual world. Thus, for example, virtual environment 18A may be a retail establishment designed to sell electronic goods such as cameras and stereo equipment. Virtual environment 18B may be a virtual world designed to provide advice on real-world objects such as electronic goods and to provide training services on those goods. Virtual environment 18C may be an virtual environment simulating life in general, in which Avatars create a home for themselves and furnish it with objects such as virtual television sets, virtual furniture, and other common home furnishings. This description of the virtual environments 18A-C is intended to be merely an example of several types of distinct/unrelated virtual environments that may be linked together. The invention is not limited to use in connection with this particular example.

Each virtual server or set of servers 20A, 20B, 20C, thus supports one particular distinct virtual environment. Alternatively, a given set of servers may support more than one distinct virtual environment. For example, virtual environment servers 20A may support two or more unrelated virtual environments. Two or more virtual environments may be distinguished as being parts of different three dimensional coordinate space.

The user 12 includes a computer 22 running a virtual environment client 24 and a user interface 26 to the virtual environment. The user interface 26 may be part of the virtual environment client 24 or implemented as a separate process. A separate virtual environment client 24A-C may be required for each virtual environment 18A-C, although a particular virtual environment client may be designed to interface with multiple virtual environment servers. The user may see a representation of a portion of the computer-generated three dimensional virtual environment on a display/audio 28 and input commands via a user input device 30 such as a mouse or keyboard. The display/audio 28 may be used by the user to transmit/receive audio information while engaged in the virtual environment. For example, the display/audio 28 may be a display screen having a speaker and a microphone. The user interface generates the output shown on the display under the control of the virtual environment client, and receives the input from the user and passes the user input to the virtual environment client. The virtual environment client passes the user input to the virtual environment server which causes the user's Avatar 32 or other object under the control of the user to execute the desired action in the virtual environment. In this way the user may control a portion of the virtual environment, such as the person's Avatar or other objects in contact with the Avatar, to change the virtual environment for the other users of the virtual environment.

Figure 2:
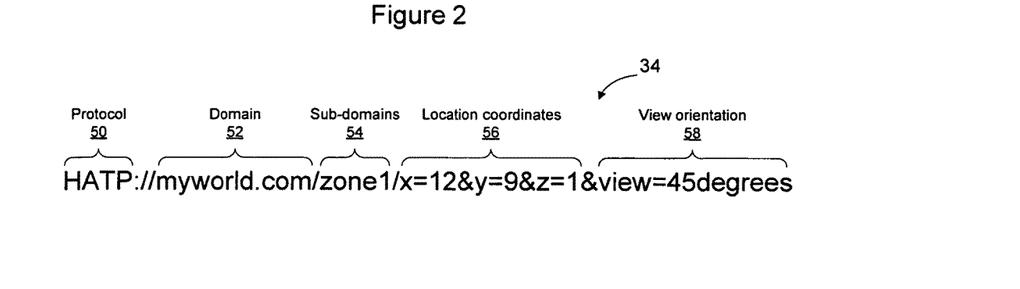
FIG. 2 is a diagram of an example link format that may be used to link between distinct virtual environments.

Conventionally, virtual environments have been isolated environments such that an Avatar in one environment could not jump to another environment, retrieve objects from another environment, or otherwise interact with the other environments. According to an embodiment of the invention, a linking mechanism is provided that enables references between virtual environments. For example, as shown in FIG. 1, the references 34 may allow different virtual environments to specify locations and orientations in other virtual environments which may then allow users to move from one virtual environment to the next virtual environment, or to import objects from one virtual environment into the other virtual environment. Additionally, as shown in FIG. 2, the linking mechanism may allow vistas to be created between virtual environments so that it is possible to see from one virtual environment into another virtual environment. By combining the vistas and links, it is possible to create portals that allow participants to see between virtual environments and then walk or otherwise navigate between virtual environments to seamlessly integrate multiple virtual environments.

In the embodiment shown in FIG. 1, assume as described above that virtual environment 18C simulates life in general, and the participant elects to acquire a television set for their virtual home. The person may decide that they would like to do research on televisions and may be linked via a link 34-1 to another virtual environment 18B designed to provide advice and training on types of television sets that are available in the real world.

After learning about the types of television sets that are available and what particular brands are available, the participant may return to the original virtual environment and place the selected television set in their virtual house or apartment. Optionally, the user may then also desire to purchase a real television set for use in their real house in the real world. Another link 34-2 may link from the virtual environment 18C to another virtual environment designed to sell consumer electronics 18A. The virtual environment that is designed to sell consumer electronics 18A may have, for example, various representations of available television sets, a check-out counter, and an Avatar representing a store clerk. The participant may select the television that they would like to purchase in the real world, bring the television to the counter, and pay the Avatar representing the store clerk for the television with a credit card. The television will then be shipped by the store represented by the virtual environment 18A to the person's actual real-world house.

Other links may be used as well, and this example is merely intended to provide a context to help understand how virtual environments may be linked together to allow a particular participant to jump from one virtual environment to the other, so that the benefits of the multiple virtual environments may be combined to provide an enhanced experience for the user.

As another example, assume that the participant is currently engaged in a virtual environment simulating a real-world situation, and the participant starts to get hungry. The participant may cause their Avatar to walk or drive to a pizza parlor to order pizza. When the Avatar opens the door to the pizza parlor, a hyper link may take the Avatar to a separate virtual environment owned and operated by a chain of pizza restaurants or to a pizza restaurant local to the user. By causing the Avatar to place an order in the separate virtual environment, the user may order a pizza to be delivered to their home in the real world. The participant may then exit the restaurant and re-enter the first virtual environment to resume their interaction in the original virtual environment.

FIG. 2 shows a diagram of an example link format that may be used to link between virtual environments. As shown in FIG. 2, the link 34 includes a protocol field 50 to specify the type of protocol being used to specify the structure of the link. In the Internet, the portion of an address before the colon double backslashes "://" is used to specify the format of the link. The format of the link may follow a common standard format, such as specified by the HyperText Transfer Protocol (HTTP) or Secure Socket Layer (SSL) also referred to as Secure HTTP (HTTPS). Alternatively, a new protocol may be specified for linking between virtual environments, such as HyperActive Transfer Protocol (HATP) although other names may be used as well. In one embodiment, the link allows a location and orientation within a target virtual environment to be specified, so that objects, activities, Avatars, and other constructs within one virtual environment may be accessed by participants in the other virtual environment.

In the embodiment shown in FIG. 2, the link 34 specifies the domain 52 and sub-domain 54 of the target virtual environment. This allows the link to specify the particular virtual environment to which it is referring. The domain and sub-domain fields may be common Internet addresses or may be created specifically for linking between virtual environments. For example, each virtual environment may name itself and register its name with a name server that will allow virtual environments to be located on a network. For example, a service may be provided on the network to enable links to an unknown virtual environment to be resolved on the network. A service that provides this type of functionality on a network such as the Internet will be referred to herein as a Virtual Environment Name Service (VENS), although other names may be coined for a device of this nature as well. Optionally the VENS may be organized similar to a Domain Name Service (DNS) and used to resolve the location of the virtual environment within the network so that links to unknown virtual environments may be resolved in a manner similar to how links on Internet are resolved. Other mechanisms for finding the correct virtual environment may be used as well.

After specifying the target virtual environment, link 34 specifies a location within the virtual environment 56. The location may be specified, for example, using X, Y, and Z coordinates, or other coordinates, that enable the target virtual environment to understand a location within the virtual environment specified by the link. Since the link is specifying a location within the target virtual environment, the coordinates are those used by the target virtual environment. Thus, for example, where the coordinate system of the target virtual environment used absolute coordinates ranging from 0 to 100 in each direction, the location may be specified as being X=12, Y=9, and Z=1. Where the target virtual environment used polar coordinates, the location may be specified using a radius distance and angle, as well as an azimuth angle for the location.

A target virtual environment may not want its coordinate system to be visible outside of the virtual environment. Accordingly, the target virtual environment may encode or encrypt the coordinates that are specified in the links when the links are placed in other virtual environments so that investigation of the coordinates of the link will not provide any insight into the manner in which the target virtual environment is organized. When a user clicks on the link or otherwise follows the link, the encrypted/encoded coordinates will be transmitted to the target virtual environment server which may unencode and/or unencrypt the coordinates to determine the actual location of the link in the target virtual environment. A similar process may be used in connection with the orientation. This also has the advantage of not allowing a user to modify the coordinates of the link to try to get into a different portion of the target virtual environment.

In the embodiment shown in FIG. 2, the link 34 also allows the view orientation to be specified 58. Specifying the view orientation is important because the target virtual environment is a three dimensional virtual environment. Simply placing the participant at a particular location in the target virtual environment may be insufficient, since the participant may not know which way they are facing in the new virtual environment. Thus, the link format of the example link 34 allows the orientation to be specified such that when the link is followed a particular orientation within the target virtual environment may be specified as well.

Some virtual environments may wish to restrict access. Since the links provide ways for users to obtain access to the virtual environment, the virtual environment server may require the user to present credentials before allowing the user to enter the target virtual environment: For example, the link in the resident virtual environment may appear as a closed door that requires the user to open the door using a key. Keys may be provided by the target virtual environment in the form of passcodes, or other common security measures, that will allow the user to open the door and hence use the link to access the target virtual environment. Alternatively, the link may be accessed by all users in the resident virtual environment. However, the virtual environment server may require the user (i.e. Avatar) to present credentials such as a security token before actually allowing the user to enter the target virtual environment. Many ways of implementing security and restricting movement between secure virtual environments may be envisioned.

The link format shown in FIG. 2 allows multiple virtual environments to be connected, such that one virtual environment may reference another virtual environment. On a participant's computer 12, moving from one virtual environment to another virtual environment may require a new virtual environment client 24 and optionally user interface 26 to be instantiated on the user's computer 22. As virtual environment platforms standardize, the number of clients may be reduced. However, the user may need to have multiple virtual environment clients 24 instantiated on their computer at once to enable them to jump back and forth and in-between multiple virtual environments provided by the virtual environment servers.

Figure 3:
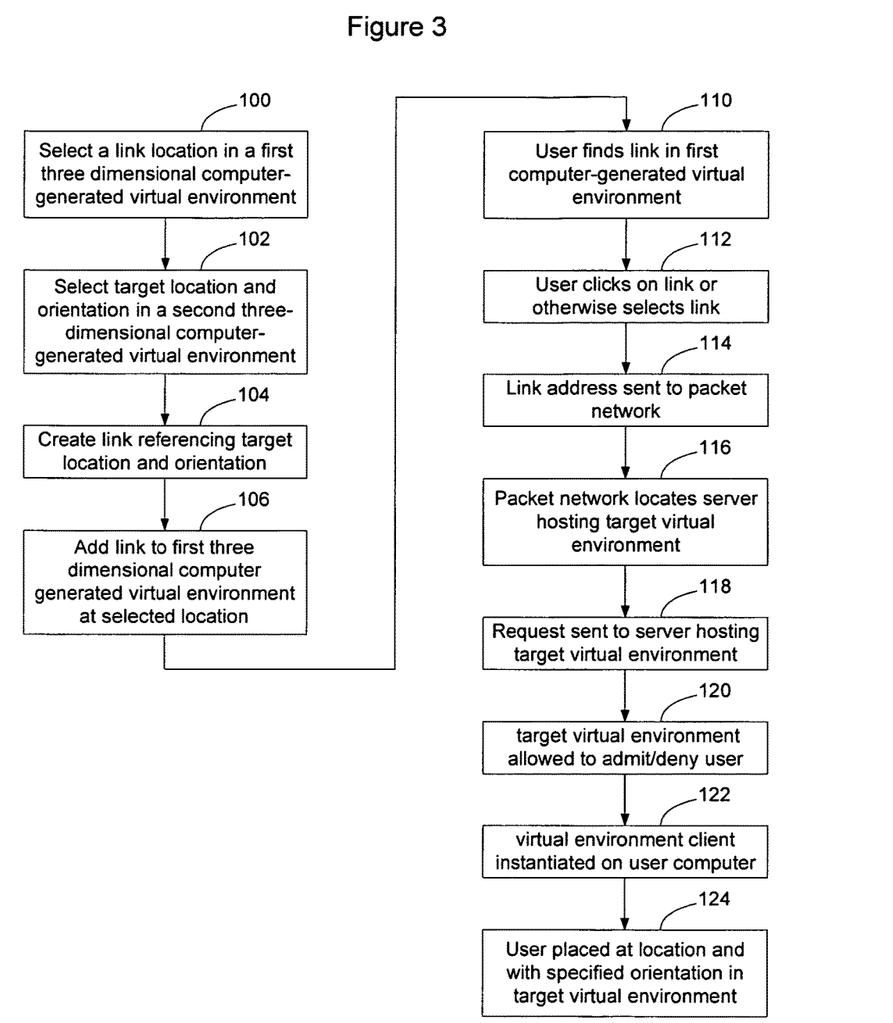
FIG. 3 is a flow chart showing a process of linking between distinct virtual environments.

FIG. 3 shows a process, portions of which may be used by one or more entities to create links between virtual environments and to enable users to navigate between virtual environments. In the embodiment shown in FIG. 3, the left column is directed to a process of creating links and the right column is directed to a process of using the links. A given user may use one or both processes depending on the particular context. For example, the links may be created by the owners of the virtual environments to enable the virtual environments to be interconnected in particular ways. Alternatively, a user within one virtual environment may select a location in that virtual environment and then add a link to that location in another virtual environment. Thus, the links may be created by the administrators of the virtual environments or, if provided with permission, by users of the virtual environments.

In the embodiment shown in FIG. 3, a link may be created by selecting a link location in a first three dimensional computer generated virtual environment (100). This will be the location where the link is placed within the virtual environment.

Since the link refers to another location, the target location and orientation in the target three dimensional computer-generated virtual environment is selected (102). The target location may be to an object, a room, an activity, or to another construct in the target virtual environment. When the target location/orientation is selected, a link may be created to specify the name of the target virtual environment domain and sub-domain, as well as the coordinates and orientation, which may then be stored as a string specifying the link (104). The link may have the format such as shown in FIG. 2, or another format. Once the link is created, it may be added to the first three-dimensional computer generated virtual environment (106) to enable Avatars or other constructs within the first virtual environment to use the link to jump to the target virtual environment.

When a user finds a link in a virtual environment (110), the user may click on the link using their mouse or otherwise select the link (112). When the link is selected, the link address will be sent to the packet network (114). As noted above, the name of the virtual environment domain and sub-domain may be contained in the link. Since the first domain and/or the packet network may not know the location of the server that is hosting the virtual environment associated with that domain, clicking on the link will cause the domain information to be transmitted to the packet network which may enable the network to resolve the domain information to locate the server hosting the target virtual environment (116).

Once the target virtual environment is found, a request may be sent to the server hosting the target virtual environment (118). Optionally, the target virtual environment may be provided with an option to allow or deny access to the user (120). For example, although a user may click on a link to enter the target virtual environment, this does not mean that the user will automatically be admitted to the other virtual environment. There are many different ways in which security may be implemented and implicated in connection with linking between virtual environments. Assuming the target virtual environment allows the user to access the virtual environment through the link, the user will be placed at the location and with the specified orientation in the target virtual environment (124).

Depending on the implementation of the target virtual environment, a virtual environment client may need to be instantiated on the user's machine (122). This process may happen when the user first clicks on the link, when the target virtual environment is first located, once the target virtual environment has accepted the user, or at another point in the process. Optionally, the user client may be instantiated in connection with or prior to the target virtual environment selectively admitting the user, so that the target virtual environment may interact with the virtual environment client to learn identifying credentials associated with the user. Additionally, where the user does not have a virtual environment client for the target virtual environment, the target virtual environment may cause a client to be downloaded to the user's computer for use in connection with interactions with the target virtual environment.

The previous discussion has been focused on how links may be created between virtual environments. There may be instances where, instead of having a link, it would be advantageous to show a view into a target virtual environment within an Avatar's resident virtual environment. This embodiment is shown in FIG. 4.

As shown in FIG. 1, virtual environments are logically distinct virtual worlds that each have their own space and are hosted by servers or banks of servers to allow users to interact with each other in a given environment. Since each of the virtual environments is separate, it does not logically make sense to think of the worlds as being related in space. Rather, each virtual environment floats on its own and is independent of the other virtual environments. The links described above allow the virtual environments to be tied together such that users and objects may jump from one virtual environment to another virtual environment and allow the landing location and orientation of the user to be specified within the target virtual environment.

Figure 4:
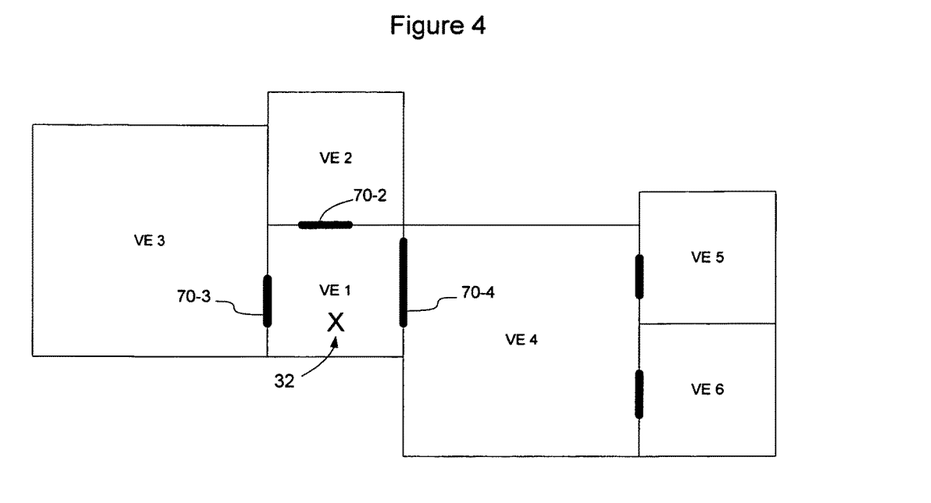
FIG. 4 is a functional block diagram showing vistas between adjacent virtual environments.

In the embodiment shown in FIG. 4, this concept is taken one step further. Specifically, in the embodiment shown in FIG. 4, a vista from one virtual environment may be specified into another virtual environment. This allows a user in one virtual environment to see through the vista into another virtual environment to, in effect, cause the virtual environments to appear to be neighboring portions of a common virtual environment. Where the vistas of FIG. 4 are combined with the links of FIGS. 1-3, this may enable portals to be created between the virtual environments to seamlessly integrate multiple virtual environments.

In the embodiment shown in FIG. 4, a user's Avatar 32 is located in a resident virtual environment (virtual environment 1) and is provided with three vistas 70 to other target virtual environments. Specifically, a first vista 70-3 allows the user to see into virtual environment VE3, a second vista 70-2 allows the user to see into virtual environment VE2, and a third vista 70-4 allows the user to see into virtual environment VE4. Content from each of the virtual environments is processed and presented to the user in the vista so that the user can see from its resident virtual environment into each of the neighboring target virtual environments. Optionally, where the view into the target virtual environments is restricted, the Avatar may need to enter credentials into the vista to activate the vista. For example, the Avatar may need to enter its ID and password into the vista which would be presented to the target virtual environment to allow the target virtual environment to determine whether it would like the user to be able to see into the target virtual environment. The credentials may be presented automatically when the user comes within a particular proximity of the vista or may need to be presented manually by causing the user to interact with the vista or with a vista control.

Figure 5:
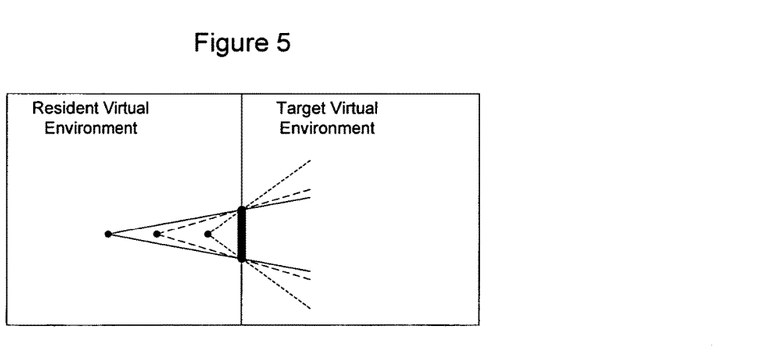
FIGS. 5 and 6 show different views to be shown to a user of a resident virtual environment through a vista into a target virtual environment as the user moves within the resident virtual environment.

FIG. 5 shows a conceptual view of an Avatar in a resident virtual environment seeing through a vista 70 into a target virtual environment. In the embodiment shown in FIG. 5, when the user is oriented to see the vista, the resident virtual environment will obtain information to be displayed on the vista from the target virtual environment. The vista will be associated with a location and an orientation in the target virtual environment, which allows the vista to be placed at a particular place in the target virtual environment. Optionally, the vista may also have a view back into the resident virtual environment, although that is not required.

The location and orientation in the target virtual environment specify what portion of the target virtual environment is to be shown through the vista. However, since the target virtual environment is a three dimensional rendering of a real or imagined environment, it would be advantageous to present this from the user's perspective. Accordingly, the coordinates of the user may be passed to the target virtual environment and used by the target virtual environment to determine what the representation should look like and what should be shown to the user on the vista. To compute this, the size of the vista and the coordinates of the user may be used. Since the user is outside of the target virtual environment and looking into the virtual environment, negative coordinates may be used to specify the user's position in the target virtual environment.

Figure 6:
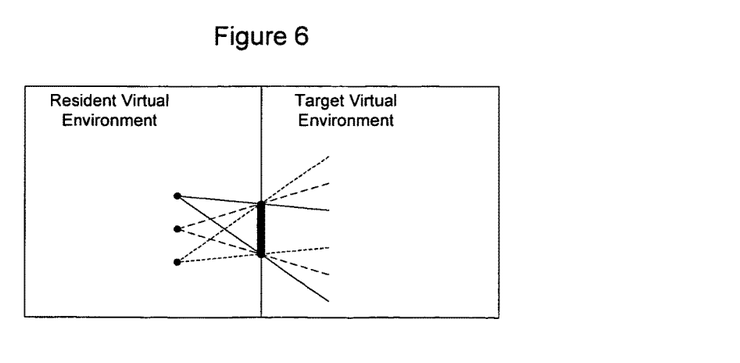

FIGS. 5 and 6 show several ways to adjust the user's view of the virtual environment. FIG. 5 shows how the user's view may change as the user moves closer to the vista. As shown in FIG. 5, when the user moves closer the angle of view into the target virtual environment increases so that the user can see more of the target virtual environment. This embodiment is similar to moving closer to a window in that the user is able to see more as the user nears the window, and less as the user moves away from the window.

FIG. 6 shows the view that is presented to the user as the user moves past the window. As shown in FIG. 6, the user's view will change as the user looks through the window at different angles so that the user is able to see different portions of the target virtual environment as the user moves past the window.

The presentation that is available via vistas may be combined with links to the other virtual environment to allow portals to be created between the virtual environments. Specifically, the vista may be provided with a link to take the user to the location within the target virtual environment when the user approaches the vista and attempts to climb through the vista. In this embodiment the linking mechanism described above may cause the user's Avatar to be transported to the other virtual environment to allow the two virtual environments to be linked together, both visually and actually, so that a person can move seamlessly from one virtual environment to the other.

Enabling virtual environments to be meshed such that Avatars can see from one virtual environment into the next, and optionally migrate between the two, opens up new possibilities for integration of virtual environments. For example, an on-line shopping mall may open a mall in virtual space and have stores create their own virtual environments that they may use to present goods for sale. Each store may maintain its own store in its own virtual environment and, hence, maintain control over information that is passed from Avatars to store clerk Avatars within the virtual environment. The virtual environment operated by the store may be secure in that information is able to be passed between the store Avatar and user Avatar in a secure manner so that users may shop securely in the virtual store. However, enabling the stores to be linked to the shopping mall enables the store to have a presence in another virtual environment. Optionally, then, the same store may have a presence in multiple virtual environments such that a retail establishment may have one on-line virtual environment with portals to multiple on-line malls. Numerous possibilities are thus available using the links, vistas, and combinations described herein.

The functions described above may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of referencing between three dimensional computer-generated virtual environments, the method comprising the steps of:
instantiating a first virtual environment client software application on a user's machine, the first virtual environment client software application enabling the user machine to participate in a first virtual environment;
accessing the first virtual environment using the first virtual environment client software application;
referencing a link to a second virtual environment in the first virtual environment, the link enabling an Avatar associated with the user in the first virtual environment to move from the first virtual environment to the second virtual environment;
upon referencing the link, instantiating a second virtual environment client software application on the user's machine, the second virtual environment client software application being a separate process from the first virtual environment client software application and not a separate instance of the first virtual environment client software application, the second virtual environment client software application enabling the user machine to participate in the second virtual environment;
wherein the first virtual environment and second virtual environment are unrelated virtual environments accessed using different virtual environment client software applications and implemented as separate and independent virtual environments not forming part of the same virtual world.

2. The method of claim 1, wherein the link identifies the second virtual environment to enable a server hosting the second virtual environment to be located on a network.

3. The method of claim 1, wherein the link specifies coordinates within the second virtual environment and an orientation within the second virtual environment.

4. The method of claim 3, wherein the coordinates and orientation are encrypted within the link.

5. The method of claim 1, wherein access to the link is restricted in the first virtual environment by the second virtual environment.

6. The method of claim 1, wherein access to the second virtual environment is controlled by the second virtual environment such that a user using a link in the first virtual environment does not automatically have access to the second virtual environment.

7. The method of claim 1, wherein the second virtual environment is a virtual-reality three dimensional map including a representation of an environment modeled after the physical world.

8. A method of enabling a partial representation of a target virtual environment to be presented to a user in a resident virtual environment, the method comprising the steps of:
instantiating a resident virtual environment client software application on a user's machine, the resident virtual environment client software application enabling the user machine to participate in the resident virtual environment;
accessing the resident virtual environment using the resident virtual environment client software application;
instantiating a target virtual environment client software application on the user's machine, the target virtual environment client software application being a separate process from the resident virtual environment client software application and not a separate instance of the resident virtual environment client software application, the target virtual environment client software application enabling the user machine to participate in the target virtual environment;
defining a location and orientation within the target virtual environment, the location and orientation being used by the target virtual environment client software application to create a display of the partial representation of the target virtual environment; and
generating the partial representation of the target virtual environment for the user of the resident virtual environment based on a location of the user in the resident virtual environment relative to a vista that is to be used to display the partial representation of the target virtual environment in the resident virtual environment;
wherein the target virtual environment and resident virtual environment are unrelated virtual environments implemented as separate and independent virtual environments not forming part of the same virtual world and having different coordinate spaces and access controls, and requiring that different virtual environment client software applications be used to access the respective virtual environments.

9. The method of claim 8, wherein the representation of the target virtual environment appears as if the user is looking into the target virtual environment.

10. The method of claim 8, wherein the partial representation of the target virtual environment changes as the user moves relative to the vista that is to be used to display the partial representation of the target virtual environment in the resident virtual environment.

11. The method of claim 10, wherein as the user moves relative to the vista, an angle of view into the target virtual environment is adjusted.

12. The method of claim 8, wherein the partial representation of the target virtual environment changes as the user approaches the vista that is to be used to display the partial representation of the target virtual environment in the resident virtual environment.

13. The method of claim 12, wherein a relative distance between the user and the objects shown in the partial representation of the target virtual environment appear to be reduced as the user approaches the vista.

14. The method of claim 8, wherein the vista further comprises a link to the target virtual environment.

15. The method of claim 14, wherein the link specifies coordinates within the target virtual environment and an orientation within the target virtual environment.

16. The method of claim 15, wherein the coordinates and orientation are encrypted within the link.

17. The method of claim 8, further requiring the user to present credentials to the target virtual environment to view the partial representation of the target virtual environment via the vista.

18. The method of claim 17, further requiring the user to present credentials to enter the target virtual environment through the vista.

19. An amalgamated virtual environment, comprising:
a first server comprising:
   a memory device storing executable instructions;
   a processor in communication with the memory device, wherein the processor, when executing the executable instructions:
      implements a first three-dimensional computer-generated virtual environment which is distinct from a second three-dimensional computer-generated virtual environment implemented by a second server; the first and second three-dimensional computer-generated virtual environments being implemented as separate and independent virtual environments, not forming part of the same virtual world, and having independent coordinate spaces and access controls, and requiring that different virtual environment client software applications be used to access the respective virtual environments; and
the first three-dimensional computer-generated virtual environment comprising one or more links to the second three-dimensional computer-generated virtual environment to allow users to move from the first three-dimensional computer-generated virtual environment to the second three-dimensional computer-generated virtual environment;
wherein the different virtual environment client software applications are separate processes and not separate instances of the same virtual environment client software application.

* * * * *